March 26, 1963 SHO TAKAHAMA 3,082,673
SHUTTER FOR PHOTOGRAPHIC CAMERAS
Filed March 23, 1959 2 Sheets-Sheet 1

INVENTOR
SHO TAKAHAMA

March 26, 1963  SHO TAKAHAMA  3,082,673
SHUTTER FOR PHOTOGRAPHIC CAMERAS
Filed March 23, 1959  2 Sheets-Sheet 2

INVENTOR
SHO TAKAHAMA

BY Stanley Wolder
ATTORNEY

United States Patent Office 3,082,673
Patented Mar. 26, 1963

3,082,673
SHUTTER FOR PHOTOGRAPHIC CAMERAS
Sho Takahama, Nishinomiya-shi, Japan, assignor to Yashica Co., Ltd., Tokyo, Japan and Kabushiki Kaisha Konan Kamera Kenkyu-Jo, Hyogo-ken, Japan, a corporation of Japan
Filed Mar. 23, 1959, Ser. No. 801,290
Claims priority, application Japan Apr. 23, 1958
2 Claims. (Cl. 95—55)

The present invention relates to a shutter for photographic cameras and more particularly to a focal plane shutter.

An object of the present invention is to provide a focal plane shutter which can perform well, has a simple construction and which may be employed in very small cameras such as those using 16 mm. films.

The above and other objects are achieved in the preferred embodiment of the present invention here described by employing a focal plane shutter consisting of two correspondingly apertured plates spring-biased in the same direction away from a cocked position and held in cocked position by latch and pawl members, which are sequentially released after the shutter release button is depressed by means first of a lever which depresses a latch member to release one shutter plate, which shutter plate carries an extension in the form of a pawl member which displaces a speed-change lever which is positioned nearer or further away from the initial position of said pawl member so as to be contacted sooner or later, depending upon its given position, after being set by rotation of a shutter speed disk to which it is excentrically pivotedly mounted, and which lever when so depressed in turn depresses a second lever which is part of a latch system which releases the second shutter plate, thereby determining by the position of said speed-change lever the amount of overlapping of the apertures in said shutter plates and hence explosure for any given setting of said shutter speed disk.

Other objects and a fuller understanding of the present invention may be had by referring to the following detailed description and claims, taken in conjunction with the accompanying drawings which illustrate preferred embodiments thereof, it being understood that the foregoing statement of the objects of the invention and the brief summary thereof is intended to generally explain the same without limiting it in any manner.

FIG. 1 is an elevation of a device embodying the present invention, the camera body or housing being shown only schematically.

FIG. 2 is a plan view of the device of FIG. 1, cocking lever 2, shutter release button 15 and lever 16 being removed.

Figure 1:
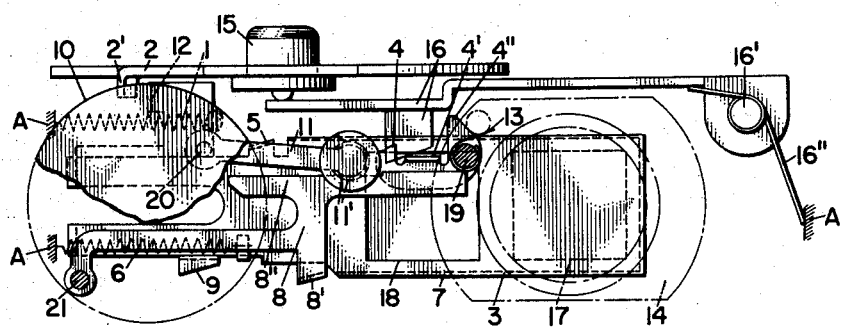
Figure 2:
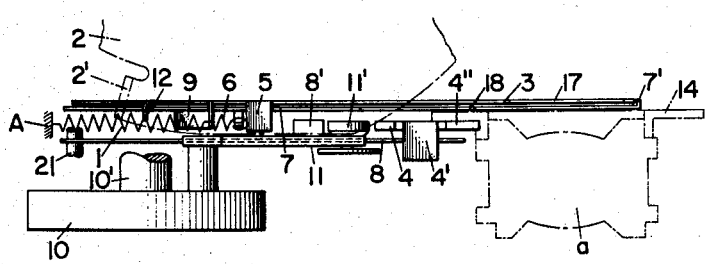

Referring now to the drawings, the preferred form of the invention there illustrated consists of a camera body or housing A, in which the components to be described are housed and to which they are connected. A cocking lever 2 is mounted for rotation in a counterclockwise direction as illustrated in FIG. 2 thereby carrying a depending contact member 2' from left to right (as shown in FIG. 1) in order to cock the shutter to be described, the said cocking lever being associated with a film transport and counting means as more fully described in my copending application Serial No. 801,285, filed March 23, 1959, entitled Related Film Transport Shutter Setting and Film Counter Means, now Pat. No. 3,009,406.

When contact member 2' is so moved from left to right it is urged against the ear 12 of an upstanding lug 12' on rear shutter plate 3, thus pushing said plate from the position at the left (shown in FIG. 1) to the position at right (shown in FIG. 3) against the bias of shutter spring 1, which is connected between body A and a second ear 12" extending forwardly from lug 12', and which spring biases said plate toward the left, i.e. away from the uncocked position. As rear shutter plate 3 moves toward the right it carries with it front shutter plate 7 since its right edge contacts a rearwardly directed flange 7' extending along the right edge of plate 7, front plate 7 thus being pushed into a cocked position against the bias of spring 6 which is connected at one end to camera body A and at the other end to an upstanding ear 7" projecting from plate 7, which spring biases said plate away from the cocked position and toward the left in the drawings.

Each of said rear and front shutter plates 3 and 7 have formed therein matching peripherally square apertures 17 and 18, respectively, aperture 17 in plate 3 being positioned closer proximate the right edge thereof whereas aperture 18 is positioned further toward the left so that in the cocked position no part of the two apertures register or are superimposed.

As rear shutter plate 3 is moved toward a cocked position a pawl member 5, which in the form shown consists of a forwardly bent extension of said shutter plate, rides upon and displaces contact member 4 which is a part of a lever 4" pivotally mounted to camera body A by means of a pin 19, said lever being biased in a rearward direction by spring 13. Pawl member 5 and contact member 4 have matching cammed surfaces and after pawl member 5 has passed the righthand edge of contact member 4 spring 13 acts to raise said member behind the trailing edge of contact member 4 and to prevent its return by spring 1 toward the left, thus latching it into the cocked position.

Similarly, as front shutter plate 7 is moved toward the right a pawl member 9, consisting of a forwardly bent portion thereof, which in turn has a downwardly extending front flange the edge of which is cammed upwards toward the right, rides over and depresses a contact member 8' which consists of a forwardly bent portion of a latch lever 8, which is pivotally mounted to move in the vertical plane by means of a pin 21 to camera body A, the said latch member being biased in an upward direction by spring means not shown. After pawl member 9 passes contact member 8', lever 8 is then urged upwardly by said spring behind pawl member 9, thus preventing the return of front shutter plate 7 towards the left by the action of spring 6 and thus latching said plate in the cocked position. In the cocked position, aperture 18 in front shutter plate 7 is coaxial with the optical axis of a lens a, which is held in position by a lens mounting 14. Although not shown, the film to be exposed by the action of the shutter would lie along a continuation of said axis past the shutter plates and would, of course, not be exposed until apertures 17 and 18 in said plates were positioned so as to be somewhat superimposed.

A shutter release button is mounted so as to extend through the camera body A at one end and so as to contact at its inner end a lever 16 pivoted by means of a pin 16' to body A and biased by a spring 16" so as to be urged upwardly against button 15, said lever 16 having a downwardly bent portion the lower edge of which normally is suspended over a contact member 4' in the form of a forwardly bent extension of the upper portion of lever 4". A shutter speed disk 10 is rotatably connected to body A, by means of axle 10' keyed thereto, which axle by means (not shown) may connect to a speed setting and indicating knob (not shown) at the outside of camera body A and be controlled by the rotation thereof.

Eccentrically and pivotally mounted to shutter speed disk 10, by means of pin 20, is a speed-change lever 11, the free portion 11' thereof terminating in opposed circular plates secured to said free end, which form between them a groove by which the lever is guided and rides upon the upper edge 8" of latch lever 8. Said lever 11 is biased in a clockwise or downward direction by a spring, not shown, which spring is not equal in strength to the spring which biases latch lever 8 in an upward or counterclockwise direction.

Figure 3:
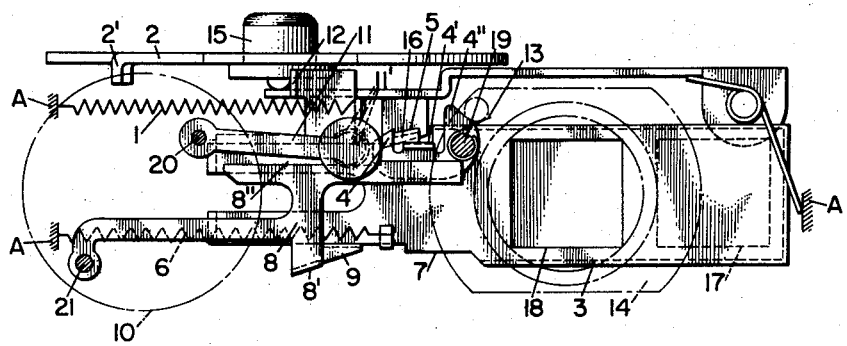
FIG. 3 is an elevation corresponding to FIG. 1 but showing the shutter in a cocked position.
Figure 4:
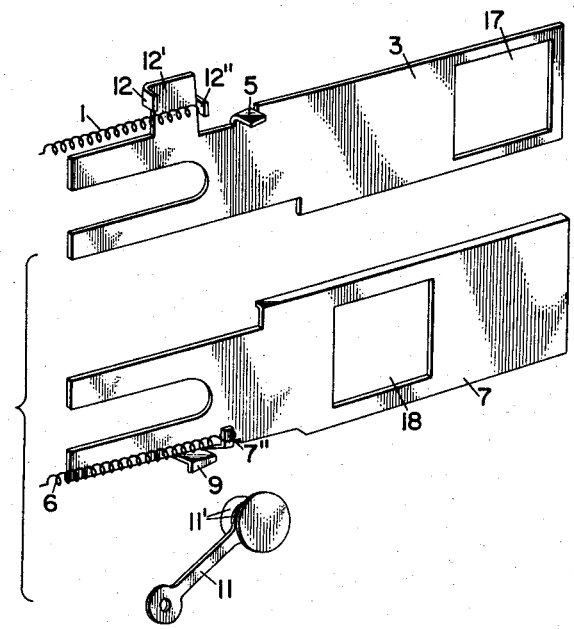
FIG. 4 is an exploded perspective view of the shutter plates and speed-change lever.

To release the shutter and expose the film for a preset time interval, after the shutter has been placed in the cocked position shown in FIG. 3 shutter release button 15 is depressed and in turn depresses lever 16 against the bias of spring 16", urging its downwardly depending portion against contact member 4' of lever 4", thus depressing contact member 4 thereof below pawl 5 of rear shutter plate 3, releasing said shutter plate which thereby commences to travel towards the left, being urged in that direction by spring 1. As pawl member 5 travels toward the left it reaches the rearward circular disk 11' on speed-change lever 11 and depresses the same, and since speed-change lever 11 rides upon the upper edge of latch lever 8 said latch lever is likewise depressed, as is contact member 8', integral therewith, which continues to to a position below the lefthand end of pawl member 9, thus unlatching front shutter plate 7, permitting the same to travel toward the left under the bias of spring 6.

In the sequence of events just described it will be noted that front shutter plate 7 commences to travel toward the left only after speed-change lever 11 has been depressed by the action of pawl member 5 or rear shutter plate 3, which contacts said lever only after shutter plate 3 has traveled a distance which is determined by the amount by which said lever has been displaced towards or away from the cocked position of pawl member 5 by the rotation of shutter speed disk 10. Since the exposure time of the film is determined by degree of overlap between apertures 17 and 18 in shutter plates 3 and 7, it will be apparent that the further that lever 11 is displaced toward the left (in the drawings) the greater will be the overlapping of said apertures as they travel toward the left across the focal plane, and hence the greater will be the exposure of the film. Thus, as shutter speed disk 10 is rotated in a clockwise direction from the position shown in FIGS. 1 and 3 and speed-change lever is displaced toward the right, the exposure time would be reduced, and, conversely, as it is displaced in a counterclockwise direction and lever 11 is displaced toward the left, the exposure time will be increased.

It should be noted that this construction enables a continuous variance of exposure time as distinguished from a discontinuous variance in stages. It should also be noted that the simplified shutter construction provided here enables the taking of time exposures without the necessity of additional parts. Thus, if speed-change lever 11 is moved to the extreme position to the left so that as rear shutter plate 3 is released by the means which is initiated by depressing shutter release button 15, said plate will move to a position so that apertures 17 and 18 fully register without pawl member 5 contacting said lever 11 and thus the shutter will remain open the maximum aperture until shutter release button 15 is further depressed thus further downwardly displacing levers 16 and 4" and thus bringing contact member 4' of said last mentioned lever into contact with the righthand portion of lever 8, lowering it and unlatching front shutter plate 7, permitting it to travel toward the left and thus to terminate the exposure.

It will be noted that no intricate parts are employed in the construction of the mechanism shown and that most of the members may be simply stamped out of plate metal. Thus the shutter may be constructed at a very low cost while maintaining the many features indicated.

Details with respect to the cooperating parts of a camera, in which the embodiment of the present invention here described in detail may be employed, are contained in my copending applications filed March 23, 1959, Serial No. 801,289, now Pat. No. 2,960,922, entitled Flash Synchronizing Device for Cameras, Serial No. 801,288, now Pat No. 3,012,490, entitled Device for Preventing the Overwinding of Film and the Premature Release of the Shutter in a Photographic Camera, Serial No. 801,287, now Pat. No. 3,011,419, entitled Device for Automatically Returning a Counter and Ejecting a Magazine, and Serial No. 801,286, now Pat. No. 3,011,418, entitled Magazine for Photographic Cameras.

Although the present invention has been described with a certain degree of particularity, it is understood that the present disclosure has been made only by way of example and that numerous variations may be employed without transcending the scope of the invention as hereinafter claimed.

What is claimed is:

1. A camera shutter mechanism comprising a pair of first and second substantially superimposed cooperating vertical shutter plates longitudinally horizontally movable between advanced cocked and retracted uncocked position, spring means urging each of said shutter plates to its uncocked position, a cocking member adapted to advance said shutter plates to their cocked positions, first and second lugs located on and movable with said first and second shutter plates respectively, a first pivoted longitudinally extending lever provided with a transversely projecting contact member and carrying a first pawl member located in the path of said first lug and adapted to engage said first lug and releasably lock said first shutter plate in cocked position, said first lever being spring urged to its lock position, a second pivoted lever carrying a second pawl member located in the path of and spring urged to engage said second lug to releasably lock said second shutter plate in cocked position, said second lever member having a longitudinally extending track, a triggering member movable to swing said first lever to a first position to urge said first pawl member out of engagement with said first lug and wherein said contact member is spaced from said second lever, a coupling element having elements depending therefrom along opposite sides of said track to maintain said coupling element along said track and being movable along said track and along and beyond the path of said first lug, and actuated by the movement of said first shutter plate when in said path of said first lug to urge said second pawl out of engagement with said second lug, said triggering member being further movable to swing said first lever to a second position in advance of said first position and said contact member into engagement with said second lever to depress said second lever and advance said second pawl member out of engagement with said second lug and release said second shutter plate when said coupling element is beyond said path of said first lug, a rotatable speed setting member, and a link connecting said coupling element to said speed setting member at a point eccentric to the axis of rotation thereof for adjustment of the position of said coupling element along said track.

2. A camera shutter mechanism in accordance with claim 1 wherein said coupling element includes a pair of transversely spaced first and second coaxial disks separated by an annular groove registering with said track, one of said disks being located in the path of said first lug.

References Cited in the file of this patent

UNITED STATES PATENTS 2,206,105    Mihalyi _____ July 2, 1940

FOREIGN PATENTS 551,906    Germany _____ Feb. 6, 1933
914,705    Germany _____ July 8, 1954